2,838,524

EPOXIDATION PROCESS

Joseph D. C. Wilson II, New Castle, Del., assignor to E. I. du Pont de Nemours and Company, Wilmington, Del., a corporation of Delaware No Drawing. Application September 20, 1955
Serial No. 535,533

8 Claims. (Cl. 260—348.5)

This invention relates to the epoxidation of olefinic double bonds of compounds containing the same.

This application is a continuation-in-part of my copending application Serial No. 269,694, filed February 2, 1952, now abandoned.

Compounds containing the epoxy group,

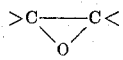

have been prepared by the two-step method of adding hypochlorous acid to a compound containing an olefinic double bond, followed by dehydrohalogenation. Epoxidation of compounds having olefinic unsaturation has also been carried out by treatment of such olefinic compounds with percarboxylic acids, for example, perbenzoic and monoperphthalic acids and, more recently, with peracetic acid. The use of peracetic acid for this purpose is advantageous and economical since it can be readily formed, prior to use or in situ, from acetic acid and contrated hydrogen peroxide. There are, however, serious disadvantages to such use of peracetic acid which are disclosed by Swern in "Chemical Reviews," 45, 1 (1949), particularly at pages 17–25. For example, it is only with special precautions that peracetic acid can be used in acetic acid solutions (acetic acid being the usual and convenient solvent for peracetic acid, and the one in which it is available commercially). Even so, if these solutions contain the usual amount of sulfuric acid which is used as a catalyst for the formation of peracetic acid, no epoxides can be isolated. There are obtained instead alpha-glycols or hydroxyacetates. In fact, the principal recorded use of peracetic acid is to prepare glycols rather than epoxides. It has heretofore been impossible to use peracetic acid to prepare readily hydrolyzable epoxides such as those epoxides which should be obtainable from olefinic compounds in which the unsaturation is nonterminal.

It is an object of this invention to provide a new and improved process for the epoxidation of a nonterminal olefinic double bond of a compound containing the same.

It is another object of this invention to provide a new and improved process for the epoxidation of a nonterminal olefinic double bond of a compound containing the same by the employment of peracetic acid.

It is still another object of this invention to provide a process for the production of readily hydrolyzable epoxides by the epoxidation of a nonterminal olefinic double bond of a compound containing the same by the employment of peracetic acid.

Other objects of this invention will appear hereinafter.

The above objects may be generally accomplished by the addition of peracetic acid to the unsaturate containing a nonterminal olefinic double bond in the presence of an acid acceptor taken from the group consisting of alkali and alkaline earth metal hydroxides and salts of alkali and alkaline earth metals with an acid weaker than acetic acid, said acid acceptor being used in an amount sufficient to neutralize all of the acid present in the reaction mixture, and isolating the epoxy compound formed.

A preferred group of the nonterminally unsaturated olefins, for which the present process represents a practical means of conversion to epoxides in good yields, may be represented by the following formula:

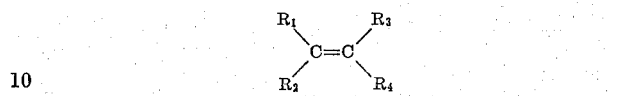

in which $R_1$ and $R_3$ are hydrocarbon (i. e., aromatic or saturated or unsaturated aliphatic hydrocarbon) and $R_2$ and $R_4$ may be hydrogen or hydrocarbon. Of these, a particularly preferred group of olefins are those in which all hydrocarbon groups represented by R's are aliphatic hydrocarbon groups.

As illustrated specifically in some of the examples which follow, these nonterminally unsaturated olefins form epoxides which are so readily hydrolyzed that the process of this invention represents the only means for preparing and isolating their epoxides in good yields.

The critical feature of this improved epoxidation method is that there is used enough of the acid acceptor to neutralize all of the acid present in the system. This includes not only the peracetic acid, but also the acetic acid in which it is normally dissolved and any other acid, such as sulfuric acid, which may be used to promote the reaction of acetic acid with hydrogen peroxide to give peracetic acid. As will be shown later, when no acid acceptor is present or when an insufficient amount of it is present, no epoxidation of the nonterminal olefinic double bond is observed in many cases, or at best a negligible yield of the epoxide is obtained.

Since acetic acid is always one of the acids present, either as such (as solvent) or through its formation from peracetic acid during the epoxidation, it is necessary that the acid acceptor be sufficiently basic to react with acetic acid. Thus, when the acid acceptor is not an alkali or alkaline earth metal hydroxide, it should be a salt of these metals with an acid weaker than acetic acid, i. e., having a dissociation constant less than about $1.8 \times 10^{-5}$.

In a preferred mode of operation of this invention, the unsaturate to be epoxidized is dissolved in an aliphatically saturated, inert organic solvent and this solution is mixed with the calculated amount of an acid acceptor, preferably sodium carbonate or sodium bicarbonate, or a slight excess thereover. To the stirred mixture, maintained at a temperature between 0° C. and 25° C., is added gradually a solution of peracetic acid in glacial acetic acid, in such amount that there is used not appreciably more than one mole of peracetic acid per olefinic double bond to be epoxidized. The reaction mass is then diluted with water and the epoxide which separates is washed and isolated by suitable means such as fractionation or crystallization.

The process of this invention is generically applicable to the epoxidation of nonterminal olefinic, i. e., carbon-to-carbon, double bonds. The nature of the olefinically unsaturated compound or the number of the double bonds it contains is substantially immaterial. Specific examples of other unsaturates than those stated below which can be epoxidized by the method described herein are hydrocarbons such as squalene, rubber, stilbene, tetra-phenylethylene, etc.; alcohols such as crotyl alcohol, geraniol, oleyl alcohol, cinnamyl alcohol, etc.; ketones such as benzylidene-acetone, etc.; acids such as oleic acid, elaidic acid, etc.; esters such as cinnamyl acetate, methyl oleate, methyl linoleate, methyl ricinoleate, olive oil, linseed oil, etc.; ethers such as 1,1-diethoxy-2-butene, etc.; and the like. The invention is of greater utility with the nonterminally unsaturated hydrocarbons, particularly those which are normally liquid or solid, such as the monomeric nonterminally unsaturated hydrocarbons having at least six carbon atoms and the unsaturated polymeric hydrocarbons. The greatest usefulness of the invention is in the preparation of readily hydrolyzable epoxides (i. e., epoxides formed from nonterminally unsaturated olefins which under the influence of acetic acid are readily converted to glycols or hydroxyacetates), for which the previous methods using peracetic acid fail or are unsatisfactory.

While peracetic acid is the most effective and most economical of the peralkanoic acids for use in epoxidation reactions, other aliphatic percarboxylic acids can be used such as performic, perpropionic and perbutyric acids. Peracetic acid is most conveniently used in acetic acid solutions, or in acetic acid-water solutions, but it may be used in solution in other inert organic solvents if desired.

The amount of peracetic acid used in relation to the unsaturate is not particularly critical, but it should preferably not exceed 1.5 moles, and still more preferably 1.2 moles, of peracetic acid per olefinic double bond. The reason for this is that larger proportions of peracetic acid tend to favor the formation of acetoxy compounds rather than epoxides. There can be used much less than one mole of peracetic acid per double bond if desired, for example, as little as 0.1 mole, with the result, of course, that the yield of peroxy compound based on the unsaturate is correspondingly decreased. However, in some cases, such as when epoxidizing unsaturated polymers, it is desirable to epoxidize only part of the double bonds present. Since it is desirable not to have an excess of peracetic acid present, it is in general indicated to add the peracetic acid to the unsaturate rather than the unsaturate to the peracetic acid, although the latter practice is also satisfactory in many cases.

The acid acceptor can be any alkali metal or alkaline earth metal hydroxide, e. g., lithium, sodium, potassium, calcium, strontium, or barium hydroxides, or a salt of these bases with an acid weaker than acetic acid, i. e., having a dissociation constant less than about $1.8 \times 10^{-5}$. These acids include, for example, carbonic acid, boric acid, and phosphoric acid (mono- and di-basic). Thus, there can be used as acid acceptor sodium hydroxide, potassium bicarbonate, barium carbonate, strontium carbonate, sodium borate, potassium dihydrogen phosphate, and the like.

As shown experimentally, the amount of the acid acceptor is critical to obtain satisfactory results, particularly in the preparation of epoxides which are susceptible to hydrolysis and/or acetylation. There should be used at least enough acid acceptor to neutralize all of the acid present in the reaction mixture or, in other words, at least one equivalent of acid acceptor for each equivalent of acid. A moderate excess of acid acceptor can be and is desirably used, for example, a 10% to 100% excess over the calculated amount. A larger excess can be used, e. g., four to five times the calculated amount, but it is uneconomical and it may sometimes be detrimental to use a very large excess. Preferably, the acid acceptor is all present in the reaction mixture at the start, that is, before addition of the peracetic acid, but both the acceptor and peracetic acid can be added together to the unsaturate at controlled rates, regulated so that there is not at any moment a significant excess of acid in the system.

The reaction is preferably carried out in the presence of a liquid diluent to facilitate contact. This can be water or an organic solvent, or mixtures thereof. Water is often a very convenient reaction medium, particularly with starting materials which are liquid rather than solid or resinous. Any nonoxidizable organic solvent which is free from aliphatic unsaturation can be used, including for example, in addition to those shown below, n-hexane, cyclohexane, tetrachlorethane, the xylenes, tetrahydrofuran, decahydronaphthalene, chlorobenzene, and the like.

The organic diluent need not be a complete solvent for the unsaturate, although it is preferable that it have appreciable solvent action. The preferred solvents are the aliphatically saturated, liquid hydrocarbons and halogenated hydrocarbons. Since the acid acceptor will generally be insoluble in organic solvents and may be insoluble in water (e. g., calcium carbonate), efficient agitation of the mixture is desirable to insure good contacts between the reactants.

The reaction is preferably carried out at low to moderate temperatures, e. g., between $-20°$ C. and $+75°$ C., and preferably between $-5°$ C. and $+50°$ C. At such temperatures, there is less tendency for hydroxyacetates to be formed rather than epoxy compounds. Normally, the process is conducted at atmospheric pressure, but higher pressures can be used, if desired, by employing suitably designed closed vessels.

The reaction time varies with the starting materials and the operating conditions, and it is not critical in any event since the epoxidation need not be complete, unless optimum yields are desired. In general, a reaction period of one to six hours at the preferred temperature range is sufficient. The progress of the operation can be estimated by determining the amount of residual peroxide in a sample of the reaction mixture. The reaction is terminated when there is little or no peroxide left.

The reaction product can be isolated by any convenient means such as separation and /or extraction if an aqueous medium is used, evaporation of the solvent with or without prior separation of the solid salts if an organic solvent is used, treatment with water followed by extraction etc. The resulting epoxide, if distillable, can then be fractionated. If undistillable, it can be crystallized from appropriate solvents, or purified by dissolving it in a solvent and reprecipitating it by addition of a nonsolvent.

The invention is illustrated in greater detail in the examples which follow, in which parts are by weight. In these examples, the peracetic acid used was a commercial solution containing, by weight, 40% peracetic acid, 5% hydrogen peroxide, 39% acetic acid, 1% sulfuric acid, and 15% water.

*Example I*

To a cold slurry of 300 parts (2.83 moles) of anhydrous sodium carbonate, 400 parts of methylene chloride, and 168 parts (2 moles) of freshly distilled tetramethylethylene was added 372 parts of a commercial solution containing 40% of peracetic acid, 39% acetic acid, 15% water, 5% hydrogen peroxide, and 1% sulfuric acid. The amount of acid added thus corresponded to 1.96 moles of peracetic acid and 2.47 moles of additional acid. The solution was added at such a rate that the temperature of the reaction mixture was maintained below 10° C. The reaction mixture was stirred vigorously during the six hours required for the addition of the peracetic acid and for one hour after the addition was completed. The mixture was treated with 2000 parts of water to remove the inorganic salts and the organic layer was separated. The aqueous layer was extracted twice with methylene chloride and these extracts were combined with the organic layer, which was then dried in turn over anhydrous sodium carbonate and anhydrous calcium sulfate. Ater removal by distillation of all material boiling below 55° C., the residue was fractionated. There was obtained 139 parts (69.5% yield) of clear, colorless tetramethylethylene oxide boiling at 90.4° C. to 91.5° C., $n_D^{25} = 1.3938$.

The necessity of using sufficient acid acceptor to neutralize the total acidity is shown by the following experiment, in which there was used enough alkali to neutralize the sulfuric acid present in the peracetic acid solution, and in fact a considerable excess thereover, but not nearly enough to neutralize all the acids present. To a cold slurry of 4.4 parts (0.041 mole) of anhydrous sodium carbonate and 42 parts (0.5 mole) of tetramethylethylene was added gradually with stirring and at a temperature below 10° C., 47 parts of a 40% solution of peracetic acid in acetic acid (0.25 mole peracetic acid, 0.32 mole acetic acid). The reaction mixture was then poured into water, the organic layer was removed, washed with 5% aqueous sodium carbonate, and dried over anhydrous sodium carbonate. On fractionation, there was obtained only 3.5 parts (7% yield based on tetramethylethylene, 14% based on peracetic acid) of tetramethylethylene oxide. The residue from the distillation consisted of a yellow solid.

When no acid acceptor is used, the epoxidation reaction does not take place, as shown by the following experiment. To a mixture of 57.5 parts of 40% peracetic acid solution with 475 parts of carbon tetrachloride maintained at 20° C. was added gradually during one hour 25 parts of tetramethylethylene, and the reaction mixture was stirred for an additional three hours. It was then washed twice with a 10% aqueous solution of ferrous ammonium sulfate, then with 200 parts of water, and dried over magnesium sulfate. After removal of the low boiling materials, only 2.6 parts of residue remained, and this was shown by distillation not to be tetramethylethylene oxide.

*Example II*

To a stirred slurry of 200 parts (2 moles) of calcium carbonate in 25 parts (0.3 mole) of tetramethylethylene and 640 parts of carbon tetrachloride was added gradually 48 parts of a commercial 40% solution of peracetic acid in acetic acid-water, corresponding to 0.25 mole of peracetic acid and 0.32 mole of acetic acid. During the addition, the temperature was maintained at 20° C. The reaction mixture was filtered and the filtrate was washed twice with 30 parts of a 10% aqueous solution of ferrous ammonium sulfate, then with 30 parts of water, and the organic layer was dried successively over potassium carbonate and magnesium sulfate. Distillation gave 10 parts (40% yield based on the peracetic acid) of tetramethylethylene oxide, B. P., 92° C. to 94° C.

*Example III*

A stainless-steel, high-speed blender cooled by circulation of ice water through a surrounding jacket was charged with 33.6 parts (0.4 mole) of tetramethylethylene and a solution of 65 parts (1.16 moles) of potassium hydroxide in 200 parts of distilled water. This mixture was stirred rapidly while 80 parts of a commercial 40% solution of peracetic acid in acetic acid-water was gradually added over a period of 45 minutes. This corresponded to 0.42 mole of peracetic acid and 0.53 mole of acetic acid. The organic layer was separated and dried over sodium carbonate, then over calcium sulfate. Distillation gave tetramethylethylene oxide, obtained in 43% yield.

*Example IV*

A solution in 15 parts of toluene of 27 parts (0.5 mole) of polybutadiene having a molecular weight of about 1200 was prepared by polymerizing 1,3-butadiene in the presence of boron trifluoride-diethyl ether complex was mixed with 90 parts of benzene and 45 parts (0.42 mole) of anhydrous sodium carbonate. This mixture was stirred and cooled below 5° C. and treated gradually with 46.5 parts of a commercial 40% solution of peracetic acid in acetic acid-water, corresponding to 0.244 mole of peracetic acid and 0.31 mole of acetic acid, then stirred for three hours after the addition of peracetic acid was completed, and finally treated with water. This precipitated the polybutadiene oxide, which was washed three times with distilled water and dried. There was obtained a polybutadiene oxide containing 2.85% of oxirane oxygen.

When the acid acceptor was used in insufficient amount to neutralize all the acid present, very little epoxidation of the double bonds occurred as shown by the following experiment. A mixture of 37 parts of a commercial 40% solution of peracetic acid in acetic acid-water and 52 parts of glacial acetic acid was treated with five parts of anhydrous sodium carbonate. The acid mixture corresponded to 0.196 mole of peracetic acid and 1.112 moles of total acetic acid. Thus, the sodium carbonate (0.047 mole) corresponded to only about 7% of the amount required to neutralize all the acid present. The above mixture was cooled to 2° C. and a solution of 10.8 parts (0.2 mole) of the same polybutadiene in 6 parts of toluene was added dropwise with stirring. After stirring for three hours following this addition, the reaction mixture was allowed to stand for sixteen hours at 4° C., then precipitated by addition of 200 parts of water with vigorous stirring. The precipitated polymer was redissolved in dioxane, reprecipitated with water and dried. Analysis indicated that its oxirane oxygen content was only 0.6%, showing that very little epoxidation had taken place.

The above experiment was essentially duplicated except that the acid acceptor consisted of 2 parts (0.015 mole) of sodium acetate trihydrate, which was the amount, plus a 100% excess, required to neutralize only the sulfuric acid present in the peracetic acid solution. The resulting polymer was precipitated by addition of water, washed twice with water, and dried. A test for oxirane oxygen was completely negative, indicating that no epoxide linkages were present. The polymer contained 67.63% carbon and 9.07% hydrogen, corresponding roughly to 50% hydroxylation of the double bonds.

*Example V*

To a solution of 27 parts (0.5 mole) of the butadiene polymer of Example IV in 110 parts of benzene was added 205 parts (0.76 mole) of disodium hydrogen phosphate heptahydrate. The mixture was stirred rapidly at room temperature while 47.5 parts of a commercial 40% solution of peracetic acid in acetic acid-water was added dropwise. This corresponded to 0.25 mole of peracetic acid and 0.32 mole of acetic acid. After completion of the addition, all solid material was removed by filtration and the filtrate was washed with water, dried, and distilled to remove the solvent. There was obtained 24 parts of polybutadiene oxide having an oxirane oxygen content of 3.55%.

*Example VI*

Following the general procedure of Pease, U. S. Patent No. 2,561,068, alpha,omega-bis[(1,1-dimethyl-1-carbomethoxy)-methyl]polybutadiene, having the formula

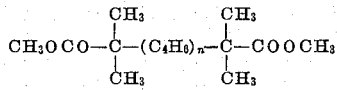

where *n* is about 7 (molecular weight about 560) was prepared by heating 1,3-butadiene at 100° C. with 32% by weight of dimethyl alpha,alpha'-azodiisobutyrate

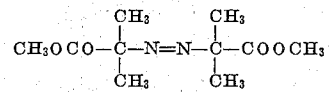

A mixture of 55.5 parts of alpha,omega-bis[(1,1-dimethyl - 1-carbomethoxy)methyl]polybutadiene, 175 parts of benzene and 134 parts (1.6 moles) of sodium bicarbonate was stirred rapidly at room temperature while adding dropwise 95 parts of a commercial 40% solution of peracetic acid in acetic acid-water, corresponding to 0.5 mole of peracetic acid and 0.63 mole of acetic acid. After the reaction mixture had been allowed to stand at room temperature for sixteen hours, the polymer was precipitated by addition of water, washed with water, and dried. It contained 5.2% of oxirane oxygen.

*Example VII*

A solution of 100 parts of a 1:1 butadiene/styrene copolymer in 350 parts of benzene was mixed with 202 parts (2.4 moles) of sodium bicarbonate. To the rapidly stirred slurry was added at room temperature over a period of six hours 142 parts of a commercial 40% solution of peracetic acid in acetic acid-water, corresponding to 0.74 mole of peracetic acid and 0.95 mole of acetic acid. The reaction product was washed twice with distilled water and dried over anhydrous magnesium sulfate, and the polymer was isolated by evaporation of the solvent. There was recovered 72 parts of epoxy-containing butadiene/styrene copolymer which had 3.9% oxirane oxygen.

*Example VIII*

In this experiment, myrcene (2-methyl-6-methylene-2,7-octadiene,

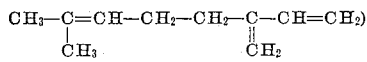

was epoxidized to give chiefly the monoepoxide, 2,3-epoxy-2-methyl-6-methylene - 7 - octene. A commercial grade of myrcene containing approximately 15% limonene was used. A mixture of 272 parts (2 moles) of myrcene dissolved in 1760 parts of benzene and of 404 parts (4.8 moles) of sodium bicarbonate was stirred rapidly at 0–5° C. during the addition of 285 parts of a commercial 40% solution of peracetic acid in acetic acid-water, amounting to 1.5 moles of peracetic acid and 1.9 moles of acetic acid. This solution was added at as regular a rate as possible over a period of 1.5 hours. The reaction mixture was then poured into 4000 parts of water, the benzene layer was separated, washed twice with about 700 parts of water, then with 700 parts of water containing 50 parts of 10% aqueous sodium hydroxide, then again with two more portions of water. Tests with aqueous potassium iodide showed that only slight amounts of peroxide were present. The benzene layer was dried over anhydrous magnesium sulfate, then filtered, treated with 2 parts of hydroquinone to remove any remaining peracetic acid and inhibit polymerization, and distilled. After removal of the benzene, there was obtained 71.6 parts of unreacted myrcene, B. P., 65°–73° C. at 21–22 mm. pressure; 53.6 parts of intermediate fractions; 74.2 parts of myrcene monoepoxide, B. P., 87°–90° C. at 18 mm. pressure, and 9.5 parts of an unidentified yellow material, B. P. about 81° C. at 2 mm. pressure. There was also 59.7 parts of residue. The myrcene monoepoxide had the following composition:

*Analysis.*—Calc'd for $C_{10}H_{16}O$: C, 78.89; H, 10.60; O, 10.51. Found: C, 79.34; H, 10.81; O, 9.85 (direct determination).

This compound had an ultraviolet absorption curve showing strong absorption at 2250 A., which is characteristic of a butadiene structure. This indicates that the compound was 2,3-epoxy-2-methyl-6-methylene-7-octene. The distillation residue contained 77.63% carbon, 10.35% hydrogen, and 4.8% oxirane oxygen. It was presumably polymerized myrcene epoxide or a copolymer of it with myrcene.

This invention provides a convenient direct method of preparing epoxides. This method has the great advantage that it permits the preparation in good yields of epoxides which could not be made through the use of peralkanoic acids by the procedures proposed heretofore.

Reference in the specification and claims by parts, proportions and percentages, unless other specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. The process for the epoxidation of a nonterminal aliphatic double bond of a hydrocarbon compound containing the same which comprises preparing a reaction mass by adding a peralkanoic acid containing not to exceed four carbon atoms to a compound represented by the formula

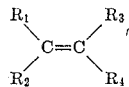

in which $R_1$ and $R_3$ are aliphatic hydrocarbon constituents and $R_2$ and $R_4$ are constituents from the group consisting of hydrogen and aliphatic hydrocarbon, in the presence of sufficient acid acceptor taken from the group consisting of alkali and alkaline earth metal hydroxides, carbonates, bicarbonates, borates, and phosphates to neutralize all acid present in the reaction mass, and isolating the epoxy compound formed.

2. The process as defined in claim 1 in which the peralkanoic acid is an aliphatic percarboxylic acid taken from the group consisting of peracetic, performic, perpropionic, and perbutyric acids.

3. The process for the epoxidation of a nonterminal aliphatic double bond of a hydrocarbon compound containing the same which comprises preparing a reaction mass by adding peracetic acid to a compound represented by the formula

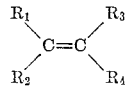

in which $R_1$ and $R_3$ are aliphatic hydrocarbon constituents and $R_2$ and $R_4$ are constituents from the group consisting of hydrogen and aliphatic hydrocarbon, in the presence of sufficient acid acceptor taken from the group consisting of alkali and alkaline earth metal hydroxides, carbonates, bicarbonates, borates, and phosphates to neutralize all acid present in the reaction mass, and isolating the epoxy compound formed.

4. The process for the epoxidation of a nonterminal aliphatic double bond of a hydrocarbon compound containing the same which comprises preparing a reaction mass by adding peracetic acid to a compound represented by the formula

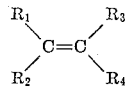

in which $R_1$ and $R_3$ are aliphatic hydrocarbon constituents and $R_2$ and $R_4$ are constituents from the group consisting of hydrogen and aliphatic hydrocarbon, in the presence of sufficient sodium carbonate to neutralize all acid present in the reaction mass, and isolating the epoxy compound formed.

5. The process for the epoxidation of a nonterminal aliphatic double bond of a hydrocarbon compound containing the same which comprises preparing a reaction mass by adding peracetic acid to a compound represented by the formula

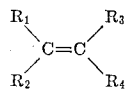

in which $R_1$ and $R_3$ are aliphatic hydrocarbon constituents and $R_2$ and $R_4$ are constituents from the group consisting of hydrogen and aliphatic hydrocarbon, in the presence of sufficient sodium bicarbonate to neutralize all acid present in the reaction mass, and isolating the epoxy compound formed.

6. The process for the epoxidation of a nonterminal aliphatic double bond of a hydrocarbon compound containing the same which comprises preparing a reaction mass by adding peracetic acid to a compound represented by the formula

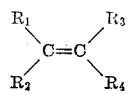

in which $R_1$ and $R_3$ are aliphatic hydrocarbon constituents and $R_2$ and $R_4$ are constituents from the group consisting of hydrogen and aliphatic hydrocarbon, in the presence of an amount of an acid acceptor in excess of that necessary to neutralize all acid present in the reaction mass, said acid acceptor taken from the group consisting of alkali and alkaline earth metal hydroxides, carbonates, bicarbonates, borates, and phosphates, and isolating the epoxy compound formed.

7. The process for the epoxidation of a nonterminal aliphatic double bond of a hydrocarbon compound containing the same which comprises preparing a reaction mass by adding peracetic acid to a compound represented by the formula

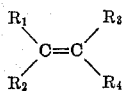

in which $R_1$ and $R_3$ are aliphatic hydrocarbon constituents and $R_2$ and $R_4$ are constituents from the group consisting of hydrogen and aliphatic hydrocarbon, in the presence of an amount of acid acceptor 10% to 100% in excess of that necessary to neutralize all acid present in the reaction mass, said acid acceptor taken from the group consisting of alkali and alkaline earth metal hydroxides, carbonates, bicarbonates, borates, and phosphates, and isolating the epoxy compound formed.

8. The process for the epoxidation of a nonterminal aliphatic double bond of a hydrocarbon compound containing the same which comprises preparing a reaction mass by dissolving a compound represented by the formula

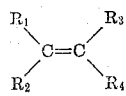

in which $R_1$ and $R_3$ are aliphatic hydrocarbon constituents and $R_2$ and $R_4$ are constituents from the group consisting of hydrogen and aliphatic hydrocarbon, in an aliphatically saturated, inert organic solvent, adding thereto an acid acceptor taken from the group consisting of alkali and alkaline earth metal hydroxides, carbonates, bicarbonates, borates, and phosphates, then adding gradually peracetic acid in an amount such that the acid content does not exceed the molecular equivalent of the acid acceptor, and isolating the epoxy compound formed.

References Cited in the file of this patent
UNITED STATES PATENTS

| | | |
|---|---|---|
| 2,347,343 | Reichert | Apr. 25, 1944 |
| 2,377,038 | Reichert | May 29, 1945 |
| 2,687,406 | Foster | Aug. 24, 1954 |
| 2,692,271 | Greenspan | Oct. 19, 1954 |
| 2,730,531 | Payne | Jan. 10, 1956 |
| 2,776,301 | Payne | Jan. 1, 1957 |

OTHER REFERENCES

Findley: JACS 67:412 (1945).